Figure 1:
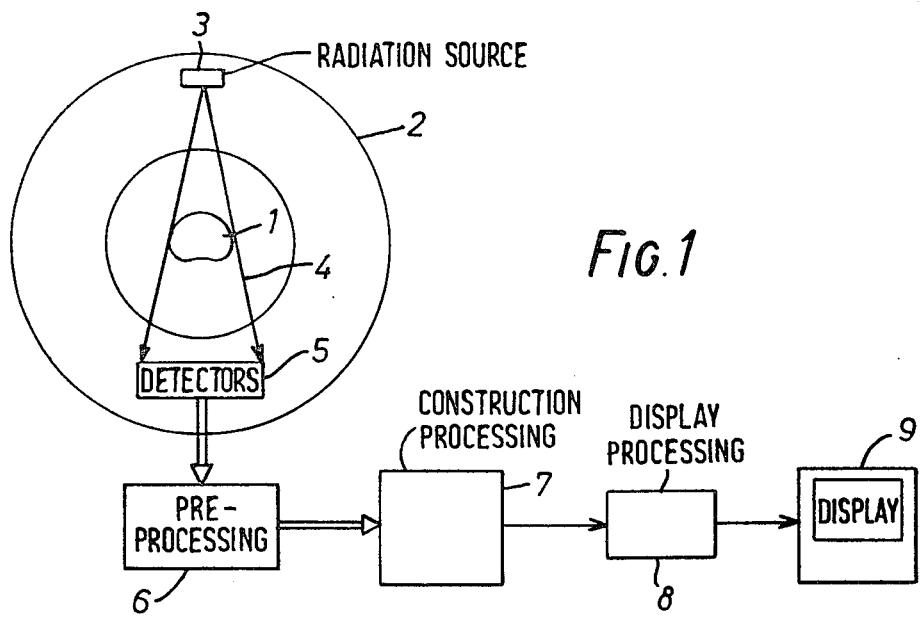

United States Patent [19]

Hounsfield et al.

[11] 4,125,858

[45] Nov. 14, 1978

[54] VIDEO DISPLAY ARRANGEMENTS

[75] Inventors: Godfrey N. Hounsfield, Newark; Donald F. McLean, Isleworth, both of England

[73] Assignee: EMI Limited, Hayes, United Kingdom

[21] Appl. No.: 781,411

[22] Filed: Mar. 25, 1977

[30] Foreign Application Priority Data

Mar. 27, 1976 [GB] United Kingdom ............... 12420/76

[51] Int. Cl.² .................. A61B 6/00; H04N 7/18; H04N 9/535
[52] U.S. Cl. .................... 358/82; 128/2 A; 358/111; 364/515
[58] Field of Search ............. 358/82, 81, 111; 364/515; 128/2 A

[56] References Cited

U.S. PATENT DOCUMENTS

| 3,258,528 | 6/1966 | Oppenheimer ...................... 358/82 |
| 3,812,288 | 5/1974 | Walsh ..................................... 58/82 |
| 4,011,584 | 3/1977 | Puckett ................................. 358/82 |

FOREIGN PATENT DOCUMENTS 2,013,093 10/1970 Fed. Rep. of Germany ............. 358/82

Primary Examiner—Howard W Britton
Attorney, Agent, or Firm—Cooper, Dunham, Clark, Griffin & Moran

[57] ABSTRACT

For a computerized radiographic apparatus, providing a cross-sectional representation of absorption of radiation in the body of a patient, there is provided a television standard display of cross-section. The display can be high-definition monochrome or in color. An arrangement is provided in which the high definition monochrome is displayed with low saturation color-wash superimposed thereon to highlight significant features in the monochrome picture.

10 Claims, 6 Drawing Figures

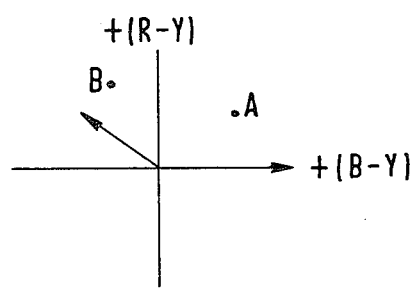
FIG. 4
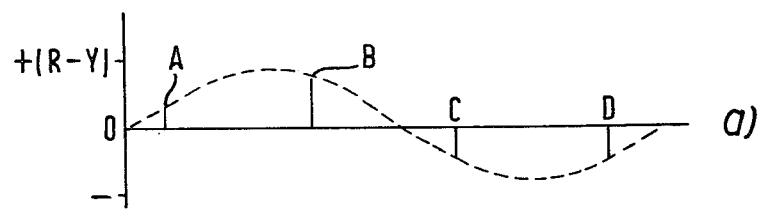
a)
FIG. 5
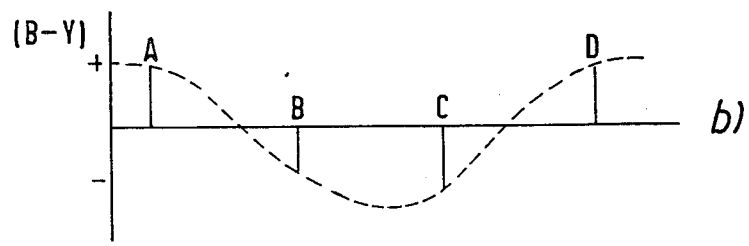
b)
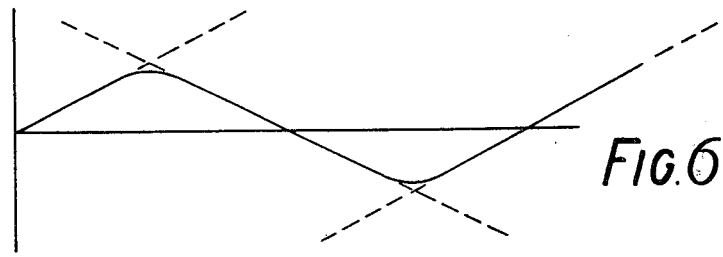
FIG. 6

VIDEO DISPLAY ARRANGEMENTS

The invention relates to video display arrangements and is particularly related to arrangements for the display of data representing the absorption of penetrating radiation in a region of the body of a patient.

In U.S. Pat. No. 3,778,614 there is described an apparatus for constructing such a representation. Such apparatus provides, by means such as those described in the said U.S. Pat. No. 3,778,614 or in U.S. Pat. No. 3,924,129, values of absorption coefficient for the radiation for individual elements of a notional matrix of elements in a cross sectional slice. Signals representing those coefficients are displayed on a suitable output device in positions corresponding to the positions of the respective elements in the slice. Preferably the data representing the absorption are converted to normal video display standards so that a television display can be used. Means for achieving this may take many forms, including for example that described in U.S. Pat. No. 4,029,948.

In order to more clearly distinguish regions of interest in the cross-sectional slice it is desirable to apply a window, as described in the said U.S. Pat. No. 3,778,614 so that the entire video density range is applied to a limited range of absorptions. This is achieved by setting a window width, defining a range of required absorptions, and a window level, defining the mean of that range. Levels below and above the required window range are defined as peak black and peak white respectively.

It is an object of this invention to provide a further means of distinguishing regions of interest in the displayed representation.

According to the invention there is provided a video display arrangement adapted to operate on monochrome video signals representing intensity levels for individual elements of a matrix of elements in a picture to be displayed, the arrangement including means for smoothing said signals to provide further signals indicative of average intensity levels for groups of said elements, means for deriving, from said further signals, colour signals having hues related to said average intensity levels and means for combining the colour signals with the monochrome video signals to provide composite signals, indicative of both the first mentioned intensity levels and the average intensity levels, for a colour television display.

If desired means may be included to limit the range of average intensity levels to which the said colour signals are related.

Figure 2:
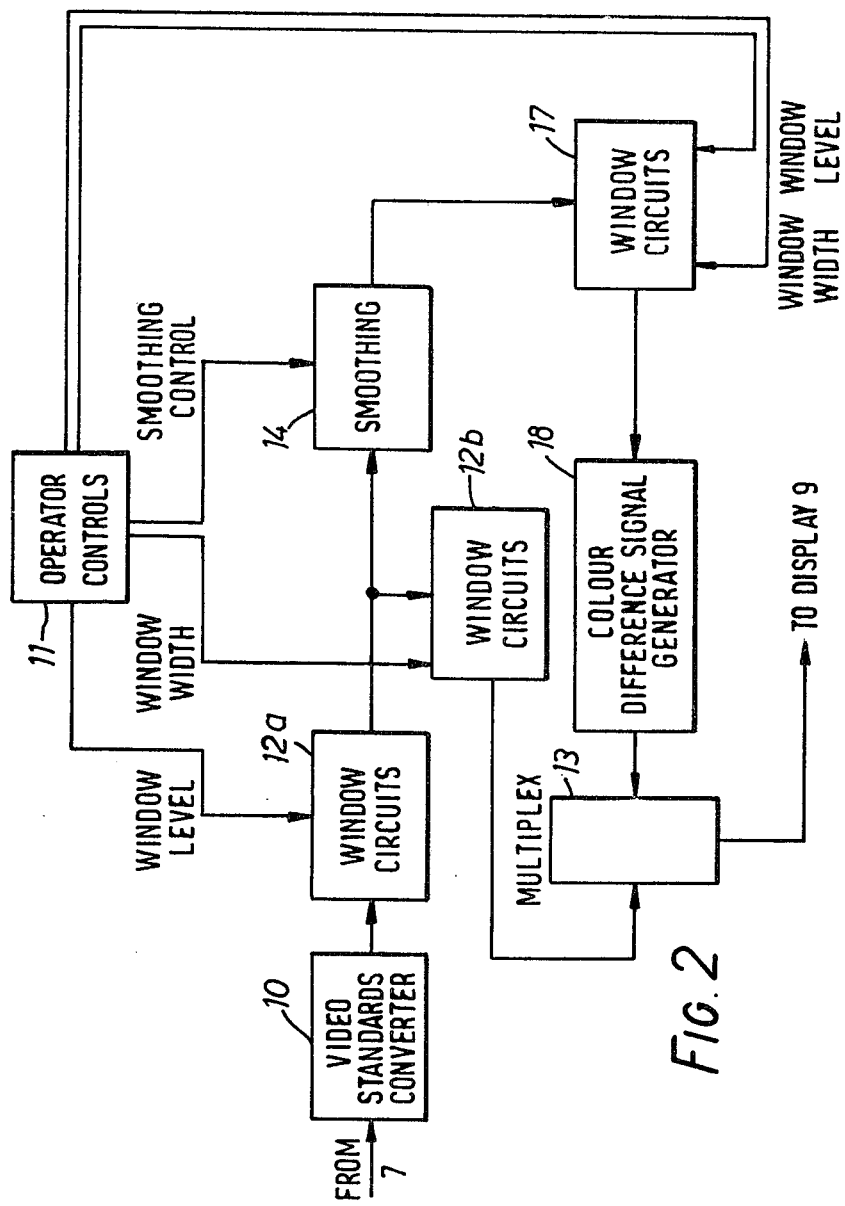

In order that the invention may be clearly understood and readily carried into effect an example thereof will now be described with reference to the accompanying drawings of which FIG. 1 shows a simplified form of a radiographic apparatus with which the invention can be used, FIG. 2 shows in block diagrammatic form a circuit suitable for implementing the invention FIG. 3 is a diagram used to explain a desirable form of smoothing, FIGS. 4 and 5 are used to explain the formation of colour signals and FIG. 6 is an illustration of a simulation of FIG. 5.

The arrangement of the present invention provides further distinction between regions of different absorption, so that smaller variations are enhanced, by displaying, preferably in addition to the high definition monochrome (grey-scale) picture, a smoothed version of that picture in colour.

A range of colours are allocated to the data values for a limited range of the grey-scale picture which is of particular interest. The colour scale chosen can be arbitrary or chosen to provide a satisfactory distinction between adjacent levels, although it is preferable that there should be a smooth gradation between different colours. By adjustment of the levels allocated to the different colours a significant change of radiation absorption can then be highlighted, so that, for example, a continuous spectrum of colours indicates a contour map of absorption or alternatively a tumour can be indicated in one colour, say red, while healthy tissue surrounding it appears in a different colour, say green. The colour information is however kept at a low saturation so that the high definition monochrome signal, providing necessary information for diagnosis, is clearly visible.

Turning now to FIG. 1 there is shown in diagrammatic form an x-ray apparatus of the kind which can conveniently use this invention. Data, relating to absorption values in the body 1 of a patient are obtained in a computerised axial tomography (CAT) apparatus indicated generally at 2. The apparatus, which includes a radiation source 3, directing a fan distribution of radiation 4 through body 1, and detectors 5, receiving the radiation, is illustrated as the type described in U.S. application No. 481,443. It can, however, take any suitable form such as those described in U.S. Pat. Nos. 3,778,614, 3,946,234, 3,924,129 and 4,010,370 or U.S. application No. 733,941. The data are pre-processed by circuits 6, in which they are, for example, converted to logarithmic and digital form, and processed in circuits 7 to provide a reconstruction of the distribution of absorption in a region of body 1. This processing, which can be as described U.S. Pat. No. 3,924,129 or U.S. Pat. No. 3,778,614 is effective to provide absorption coefficients for each element of a, normally two-dimensional, matrix of elements defined for the said region. The acquisition of the absorption data and their processing to derive the said reconstruction will not be further described because they are not relevant to this invention and because more detailed information can be obtained from the aforementioned patents and patent applications all of which are incorporated herein by reference.

The data, now representing absorption values for the said matrix, are further processed in circuits 8 which are effective to provide the data in a form compatible with the type of display used and are then displayed on a display unit 9, which is often a television monitor. Circuits 8, which normally also include a window facility, may take known forms suitable for television.

In this example circuits 8 also include circuits to apply the present invention.

Circuits for implementing the invention are shown in block diagrammatic form in FIG. 2. The data representing the picture matrix are provided from circuits 7 and applied to a video standards converter 10. This takes the data in the reconstructed form, which is typically 256 lines and 256 elements, and converts it to monochrome video data suitable to the standard of the chosen television display 9. Standards conversion is known in the art and can be effected by many known techniques. The processing to be described hereinafter is performed entirely on television standard pictures and consequently detailed implementation of the processing described can be readily implemented by those skilled in that art. Furthermore other processing may be applied to the signals, prior to display, in addition to that described.

The monochrome data are first subjected to window processing as described in U.S. Pat. No. 3,778,614. This processing applies the entire video density, or "grey-scale" range, to a limited range of X-ray absorption chosen by an operator by a control such as a potentiometer control at a control unit 11. The window control comprises two adjustments, that of window width, which defines a range of absorptions required and window level, which defines the mean of that range. In this example window level is applied first, in circuits 12a and window width subsequently, in circuits 12b. Having been subjected to the required windowing the monochrome signals are applied to a multiplex circuit 13 for output to the display 9 as a high definition monochrome picture.

The circuits thus far described are substantially those known for the arrangements of the aforesaid patents and patent applications. It will be understood however that video standards conversion can be combined with the window circuits.

In the arrangement of this invention, however, colour video signals are also derived from the monochrome signsls output from 12a, i.e. having been subject to window level control but not window width.

The signals are first subjected to two-dimensional smoothing or lowpass filtering in circuits 14 to ensure that the colour signal is not responsive to random noise in the signal and that it is representative of average levels for respective parts of the final picture. Many techniques, analogue or digital, can be used for this smoothing but a particularly desirable form will be described with reference to FIG. 3.

This figure shows part of a matrix of elements each being assigned a signal of value A. The elements may be the elements of a reconstructed matrix or may be, as in this example, groups of elements on respective lines of a television field, each group corresponding to an element of the matrix. The elements have been allocated two address numbers of which the first represents a row or line number and the second represents position in the row so that $A_{31}$, $A_{32}$, $A_{37}$ etc are elements of one row or line. In a convenient implementation the data are, on receipt at 14, held in a digital store at locations appropriate for each address. For smoothing, a value for each address is derived by taking an average of the stored value for that address with chosen surrounding addresses and storing that value at the equivalent location of a second store prior to further processing.

Thus, in FIG. 3 a value for $A_{33}$ is obtained by adding all values within square 15, i.e. $A_{22}$, $A_{23}$, $A_{24}$, $A_{32}$, $A_{33}$, $A_{34}$, $A_{42}$, $A_{41}$ and $A_{44}$, dividing by nine and applying to $A_{33}$ for the second store. Similarly a value for $A_{44}$ is the average of values in square 16. Clearly a larger number of elements can be averaged as desired and chosen elements, such as 'corners' $A_{22}$, $A_{24}$, $A_{42}$ and $A_{44}$, can be relatively deweighted.

Turning once more to FIG. 2, the smoothed video signals are subjected to a second window in circuits 17. This window applies both window level and window width, also in response to operator controls 11. This window is essentially the same as that applied to the high definition monochrome signals but serves to restrict the colour spectrum, to be created, to a range of absorption values sufficient to highlight chosen features of the reconstructed representation. The window level set in 17 is normally preset to the centre point of the grey scale set at 12a so that the later normally have primary control of the level. Independent control of each level is, however, optional.

The smoothed and windowed monochrome signals from 17 are now of relatively low definition and are used to provide colour signals in circuits 18. Circuits 18 include level detectors which provide signals representing different monochrome levels, each of which is allocated a different hue according to a chosen spectrum. The circuits may take any suitable form but are preferably arranged so that the signals are of the form which is known for colour difference signals (R-Y), (B-Y), in the colour television art.

Such colour difference signals, as is well known, can be represented on a vector diagram as shown in FIG. 4 on which the colour difference signals required are represented by the projections of the vector to the quadrature axes.

For the circuit 18, the amplitude of the black and white signal is divided at arbitrary levels between peak black and peak white. Thus a series of levels may be peak-black, A, B, C, D, peak white, and the level detectors indicate when each is exceeded. Each of the levels A, B, C, D, is allocated a position on the vector diagram, A and B being illustrated in FIG. 4 so that the colour difference signals can be allocated accordingly.

This can be seen more clearly in relation to FIG. 5 a) and b) in which the curves show the values of the hue vector as projected on the (R-Y) and (B-Y) axes respectively. Clearly the colour difference signals could be generated on the basis of FIG. 5 as continuous variations with level. In this example, however, the vector is switched from one position to another as each level is exceeded.

For a continuous variation the curves of FIG. 5 could be simulated by an analogue processor employing diode switching with diode-clipping to smooth off sharp corners, as in FIG. 6.

Alternatively a digital circuit may be used. This can employ a sine or cosine look up table, appropriate to the respective colour difference signal, held in ROM (read only memory) store.

The colour signals are also then applied to the multiplex circuit 13 to be combined with the high definition monochrome signal for display at 9, which must of course be a colour monitor.

The relative monochrome and colour signals are preferably arranged so that the combined video signals maintain a luminance value appropriate to the monochrome signals so that the addition of colour does not provide differences of luminance which may be misleading. This can be achieved by conventional techniques in multiplex circuit 13. The amplitude of the high definition monochrome can be used as the luminance Y and is matrixed with the colour difference signals to give R, G, B signals. For the digital circuits, digital to analogue conversion on the RGB signals is then provided to give the output to the colour disp;ay.

It should be noted that one advantage of such a system using signals held in ROM store is that the colour sequence may be readily changed by appropriate changes to the stored look-up tables.

The effect achieved by these circuits, when properly adjusted, is that of a low saturation 'colour-wash' highlighting significant features on the high definition monochrome picture. Adjustment to give the desired picture is achieved by manual control of the windows and smoothing in response to the displayed picture.

What we claim is:

1. A video display arrangement for processing monochrome video signals, derived from a medical examination apparatus, representing, by intensity levels of individual elements of a matrix of elements in a picture to be displayed, values of a measured quantity in a corresponding matrix of elemental areas of a region of the body of a patient, the arrangement including means for smoothing said signals to provide further signals indicative of average intensity levels for groups of said elements, means for deriving, from said further signals, colour signals having hues related to said average intensity levels and means for combining the colour signals with the monochrome video signals to provide composite signals, indicative of both the first mentioned intensity levels and the average intensity levels, for a colour television display.

2. A video display arrangement according to claim 1 including means for adjusting the average level of the said further signals relative to a reference level.

3. A video display arrangement according to claim 2 wherein the said reference level is the average level of the monochrome video signals.

4. A video display arrangement according to claim 1 including means for adjusting the average level of the monochrome video signals relative to the first mentioned intensity levels.

5. A video display arrangement according to claim 1 including means for adjusting the range of said first mentioned intensity levels encompassed in the range of said monochrome video signals.

6. A video display arrangement according to claim 1 including means for maintaining the luminance levels of the composite signals at the levels appropriate to the monochrome video signals.

7. A video display arrangement for processing monochrome video signals, derived from a medical examination apparatus, representing, by intensity levels of individual elements of a matrix of elements in a picture to be displayed, values of a measured quantity in a corresponding matrix of elemental areas of a region of the body of a patient, the arrangement including means for adjusting the average level of the monochrome video signals relative to a reference level, means for smoothing the monochrome video signals to be indicative of average intensity levels for groups of said elements, means for deriving, from the monochrome video signals after said adjustment and smoothing, colour signals having hues related to predetermined ranges of the adjusted monochrome video signals or signals derived therefrom, and means for combining the colour signals with the monochrome video signals as prior to said adjustment to provide composite signals indicative of the intensity levels and emphasising selected ranges thereof in colour.

8. A video display arrangement according to claim 7 including means for maintaining the luminance levels of the composite signals at the levels appropriate to the monochrome video signals.

9. A video display arrangement for processing monochrome video signals, derived from a medical examination apparatus, representing, by intensity levels of elements of a matrix of elements in a picture to be displayed, values of a measured quantity in a corresponding matrix of elemental areas of a region of the body of a patient, the arrangement including means for adjusting the average level of the monochrome video signals, smoothing means for operating on the adjusted video signals to provide further monochrome video signals of reduced definition, first window means for operating on the adjusted video signals to vary the range of intensity levels encompassed between peak-black and peak-white of the video signals, second window means for operating on the reduced difinition signals to vary the average level thereof relative to the average level of the adjusted video signals and to vary the range of intensity levels encompassed between peak-black and peak-white thereof, colour signals means for operating on the windowed reduced-definition signals to provide colour signals having hues related to predetermined ranges thereof, multiplex means for combining the colour signals with the monochrome video signals derived from the first window means, to provide composite signals for a colour television display and means for maintaining the luminance levels of the composite signals at the levels appropriate to the monochrome video signals.

10. A radiographic apparatus for providing a representation of the distribution of absorption of penetrating radiation in a region of the body of a patient, including standards converter means providing monochrome television standards signals representative of said distribution and a video display arrangement adopted to operate on the said television standard signals, said video display arrangement comprising means for smoothing said signals to provide further signals indicative of average intensity levels for groups of said elements, means for deriving, from said further signals, colour signals having hues related to said average intensity levels and means for combining the colour signals with the monochrome video signals to provide composite signals, indicative of both the first mentioned intensity levels and the average intensity levels, for a colour television display, and means for displaying said composite signals.

* * * * *